United States Patent [19]

Grinsted

[11] Patent Number: 4,759,138

[45] Date of Patent: Jul. 26, 1988

[54] PLOW STEERING SYSTEM

[75] Inventor: Timothy W. Grinsted, Ovingham, England

[73] Assignee: Soil Machine Dynamics Limited, Northumberland, England

[21] Appl. No.: 809,268

[22] Filed: Dec. 16, 1985

Related U.S. Application Data

[63] Continuation-in-part of Ser. No. 677,025, Nov. 30, 1984, Pat. No. 4,585,372.

[30] Foreign Application Priority Data

Dec. 19, 1984 [GB] United Kingdom ................ 8432045
Dec. 19, 1984 [GB] United Kingdom ................ 8432044
Oct. 3, 1985 [GB] United Kingdom ................ 8524410

[51] Int. Cl.⁴ .......................... F16L 1/04; E02F 5/18
[52] U.S. Cl. .......................................... 37/54; 37/98; 405/164
[58] Field of Search .................... 37/98, 193, 54, 195; 405/159, 160, 161, 164, 165

[56] References Cited

U.S. PATENT DOCUMENTS

| | | | |
|---|---|---|---|
| 2,756,654 | 7/1956 | Porterfield, Jr. et al. | 172/677 X |
| 3,140,745 | 8/1964 | Hinkle et al. | 172/292 |
| 3,431,741 | 3/1969 | Kinnan | 37/98 X |
| 3,454,285 | 7/1969 | Van Peursem | 172/677 X |
| 4,106,335 | 8/1978 | Shatto | 73/143 |
| 4,329,793 | 5/1982 | Reece | 37/193 X |
| 4,428,132 | 1/1984 | Reece | 37/193 |
| 4,585,372 | 4/1986 | Grinstead et al. | 405/169 X |

FOREIGN PATENT DOCUMENTS

| | | |
|---|---|---|
| 0144099 | 6/1985 | European Pat. Off. . |
| 3245626 | 7/1983 | Fed. Rep. of Germany ........ 37/193 |
| 1107641 | 8/1955 | France ..................................... 37/98 |
| 2141818 | 1/1973 | France . |
| 1351575 | 5/1974 | United Kingdom . |
| 2029182 | 3/1980 | United Kingdom . |

Primary Examiner—Clifford D. Crowder
Attorney, Agent, or Firm—Cushman, Darby & Cushman

[57] ABSTRACT

A pipeline trenching plough is towed along the seabed by a tow wire (20) connected to a ship or tractor. The course of the plough is changed or maintained by oppositely-acting forces imposed on the wire (20) and on the body (10) of the plough by a hydraulic ram (24). The offset angle between the wire (20) and the lengthwise direction (30) of the plough is monitored by a potentiometer (33, 35). The wire (20) is connected to the plough at a real hitch point (22) vertically above the center of resistance (23) of soil forces on the ploughshare (12) and landside (14). Under normal equilibrium conditions the forces from the ram are zero. The forces required to change the course are small and independent of the offset angle. Ram force can counteract a side-sloping seabed. In modifications, the wire (20) is connected to a virtual hitch point formed by an adjustable linkage; or by a carriage adjustable along a transverse beam.

8 Claims, 7 Drawing Sheets

PLOW STEERING SYSTEM

This is a continuation-in-part of application Ser. No. 677,025 filed Nov. 30, 1984, U.S. Pat. No. 4585372.

BACKGROUND OF THE INVENTION

1. Field of the Invention

The invention relates to methods of operating ground engaging implements, and to such implements, particularly but not exclusively pipeline ploughs and cable ploughs.

2. Description of the Related Art

A plough has been proposed in European Patent Publication No. 0010915 which is towed on the seabed by a surface vessel or by a submarine tractor using a tow member such as a wire. The tow member is connected to the plough at a hitch point above the landside of the plough or is connected to a point on a mechanism by which the tension in the tow member always acts effectively at a real or virtual hitch point above the landside. The plough is steered by forces which are reactions arising between the plough and an external surface. In particular, it is proposed to create such forces as reactions between the pipeline or cable and rollers on the plough or between ground and blades on angularly adjustable skids.

A drawback of those known proposals is that the forces available for steering are not controllable and are limited by external factors such as the need to impose only small loads on the pipeline or by the seabed conditions. Where the skids encounter rock, virtually no steering reaction can be derived and control of the plough could be difficult or impossible.

SUMMARY OF THE INVENTION

An object of the invention is to provide a method of operating a ground engaging implement in which the forces acting on the implement to maintain or change its course are derived from the tow member.

A further object is to provide a ground engaging implement to perform the method.

Any ground engaging implement has surfaces which engage the soil beneath the surface and on which soil forces act. Those forces vary greatly in magnitude but much less so in location and direction according to the working depth and speed, and to the soil type and strength. As a result there is a quite small zone beneath the soil surface through which the resultant of those forces always passes, regardless of any variations in their magnitudes and directions. The centre of that zone is referred to herein as the centre of resistance of the implement. It evidently lies beneath the soil surface between the main soil engaging surfaces, such as the shares and mouldboards, if such are present in the implement, and the landside surfaces.

A method of operating a ground engaging implement beneath water so that it travels on the bed of the water along an extending working course, according to the invention, comprises towing the implement by means of a tow member connected to the implement, imposing oppositely-acting forces on the implement and on the tow member, respectively, to maintain or correct said course as viewed in plan, said force on said tow member as viewed in plan having a direction crossing said tow member, and monitoring the relative position of the tow member and the implement.

One preferred form of a ground-engaging implement operable beneath water to travel on the bed of the water along an extended working course when towed by a tow member connected to the implement, comprises monitor means by which the relative position of the tow member and the implement can be monitored, first means to which said tow member is connected, second means connected to said implement and hydraulic ram means interconnecting said first and said second means, said ram means being effective to cause oppositely acting forces to be imposed on the implement and on the tow member, respectively, said force imposed on said tow member having a direction crossing said tow member viewed in plan. Preferably, said implement comprises a body and first and second pivot means on the body, said first means comprising first and second arms connected to said first and second pivot means, respectively, and extending sideways from said body, a bridle connecting said tow member to said arms, and third and fourth pivot means on said first and second arms, respectively, said second means comprising fifth and sixth pivot means on said body and said ram means comprising a first ram interconnecting said third and said fifth pivot means and a second ram interconnecting said fourth and said sixth pivot means. Preferably, said implement comprises crank means pivotally connected to said body, surfaces on said body on which soil forces act and defining a center of resistance through which passes the resultant of said forces created by advance of the implement, two links each connecting a respective one of said first and second arms to said crank means, said bridle having an apex connected to said tow member, said apex describing a locus when said rams are adjusted in length and said locus being an arc centered at a virtual hitch point coincident with a vertical line through said center of resistance.

DESCRIPTION OF THE PREFERRED EMBODIMENTS

Figure 1:
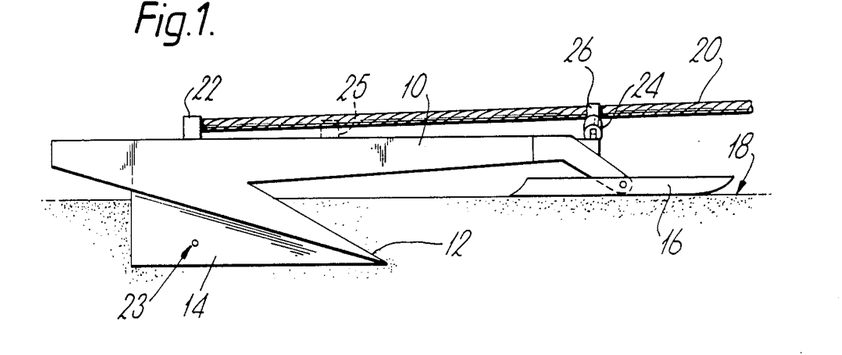
FIGS. 1 and 2; and 3 and 4 are respectively a diagrammatic side elevation and plan of two different embodiments.
Figure 2:
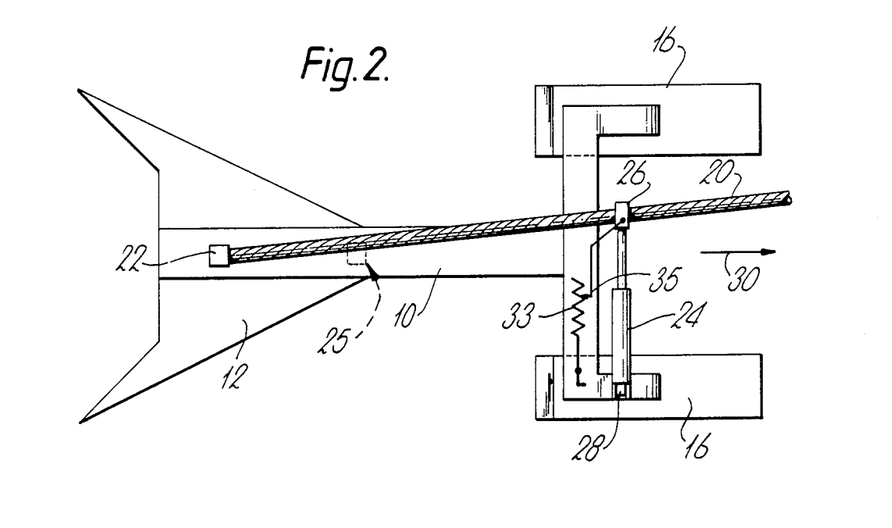

The plough shown in FIGS. 1 and 2 consists of a plough body 10 having a share 12, a landside surface 14 at each side and skids 16 which, though not shown, would be adjustable to adjust the depth of penetration of the share 12 in the seabed 18. The plough is towed by a surface vessel using a tow member such as a rope or wire 20 which is connected to the plough at a hitch device 22. The hitch device is preferably coincident with the vertical line through the centre of resistance 23 located between the landsides 14. Alternatively, the hitch device can be ahead of that line, for example at 25.

A mechanism in the form of a hydraulic ram 24 is connected between an element 26 on the tow wire 20 and another element 28 on the plough body 10. Preferably, the elements 26 and 28 both allow pivotal movement of the ram 24 about both vertical and horizontal axes. The setting of the ram 24 is monitored by a linear potentiometer made up of a resistor 33 on the body and a wiper 35 on the element 26. The potentiometer is in a circuit providing an indication to the operator of the setting of the steering mechanism i.e. the relative position of the tow member and the implement.

The plough can be towed along a course in the direction shown by the arrow 30 with the tow wire 20 in the same vertical plane as that direction or angularly offset from it as shown in FIG. 2. The direction in which the plough advances can be changed by operation of the ram 24 so that the tow wire 20 and the plough body are relatively deflected. The distance between the elements 26, 28 is varied and a steering moment is made to act on the plough. For example, by extending the ram 24, the plough would, if the surface vessel continued on its original straight course, be steered toward the right.

Relatively small forces exerted by the ram 24 are sufficient to maintain or change the course of the plough since the large side force exerted by the tow wire 20 is counteracted by one of the landsides 14. Furthermore, the magnitude of the force required from the ram 24 is independent of the offset angle between the direction of the tow wire 20 and the direction 30 of plough advance.

Should the offset angle be required to be changed to suit a change of course of the surface vessel, while the plough direction remained unchanged, the ram 24 is adjusted accordingly as the offset angle changes. The towing vessel or vehicle generally tries to maintain a course such that the tow member extends straight ahead of the plough or other implement, so that the offset angle is zero. However, in some cases it is preferable to try to maintain an offset angle of at least a certain value e.g. to prevent the tow wire from fouling a pipeline or cable.

In order to prevent the offset angle from becoming excessive the relative position of the tow member and the implement is monitored and the vessel or vehicle is steered accordingly. It is convenient to monitor the setting of the steering mechanism, either by means of the transducers described herein, or by the use of a television camera or other monitor. Should the monitor disclose or indicate that the relative position of the tow member and the implement is approaching an excessive offset angle, the course of the vessel or vehicle is changed accordingly by a steering adjustment to reduce the offset angle either to zero or to restore the desired value.

In a modification (not shown) the end part of the tow member connected to the hitch device 22 or 25 may be made up of an elongate member such as a rod, beam, bar, chain or other member. For example, such member may extend as far as the element 26.

Figure 3:
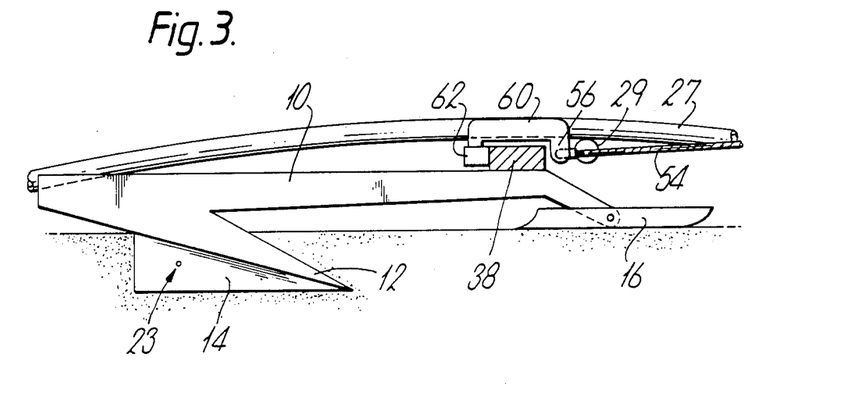
Figure 4:
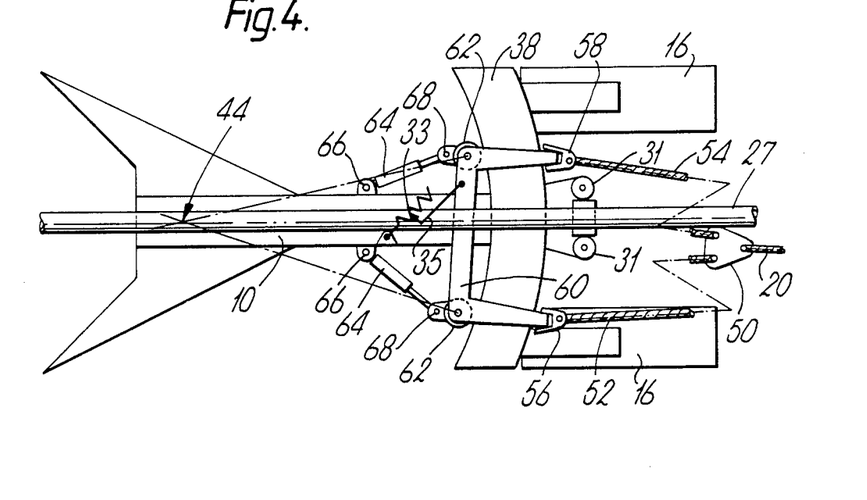

FIGS. 3 and 4 show a plough having a curved surface on a beam 38 and operable to form a trench for a pipeline 27. The tow wire 20 is connected to a link plate 50, which is part of a bridle made up of two wires 52, 54 connecting the plate 50 to respective hitch device parts 56, 58. The hitch device parts 56, 58 are connected to a carriage 60 having two rollers 62, which run against the beam curved surface. The mechanism for relatively deflecting the tow wire and the plough is two rams 64. Each ram 64 is arranged between pivot element 66 on the plough body 10 and a pivot element 68 on the carriage 60. The rams 64 are operable simultaneously, one extending and one retracting, to move the carriage 60 relatively to the beam 38 to make a steering couple act on the plough. If the carriage is moved relatively to the left of the plough as seen in FIG. 4, the couple acts to steer the plough to the right. The centre of curvature 44 of the surface on which the rollers 62 run is over the landsides 14 giving a virtual hitch point at 44 which is coincident with the vertical line through the centre of resistance 23 of the plough between the landsides 14. The tension in the tow wire 20 acts effectively through the virtual hitch point 44 under equilibrium conditions.

The plough has a U-shaped array of one horizontal roller 29 and two upright rollers 31 mounted in front of the beam 38. The pipeline 27 is received between the rollers 31 and rests on the roller 29. The plough is steered so that two side-forces exerted on the pipeline 27 by the rollers 31 are always negligible as ploughing proceeds. Sensors (not shown) detect the position of the pipeline laterally with respect to the plough. Alternatively, the reaction load imposed on the rollers 31 is detected. The position or load indication is presented to the plough operator positioned, typically, on the surface vessel so that he can adjust the steering rams 64 to ensure that the side-force on the pipeline is zero or negligible.

The setting of the steering rams 64 and the carriage 60 is monitored by a monitor shown as a linear potentiometer having a resistor 33 carried by the body 10 and a wiper 35 carried by the carriage 60. The potentiometer is connected in an indicating circuit enabling the indication of the setting of the steering mechanism to be displayed to the operator.

Figure 5:
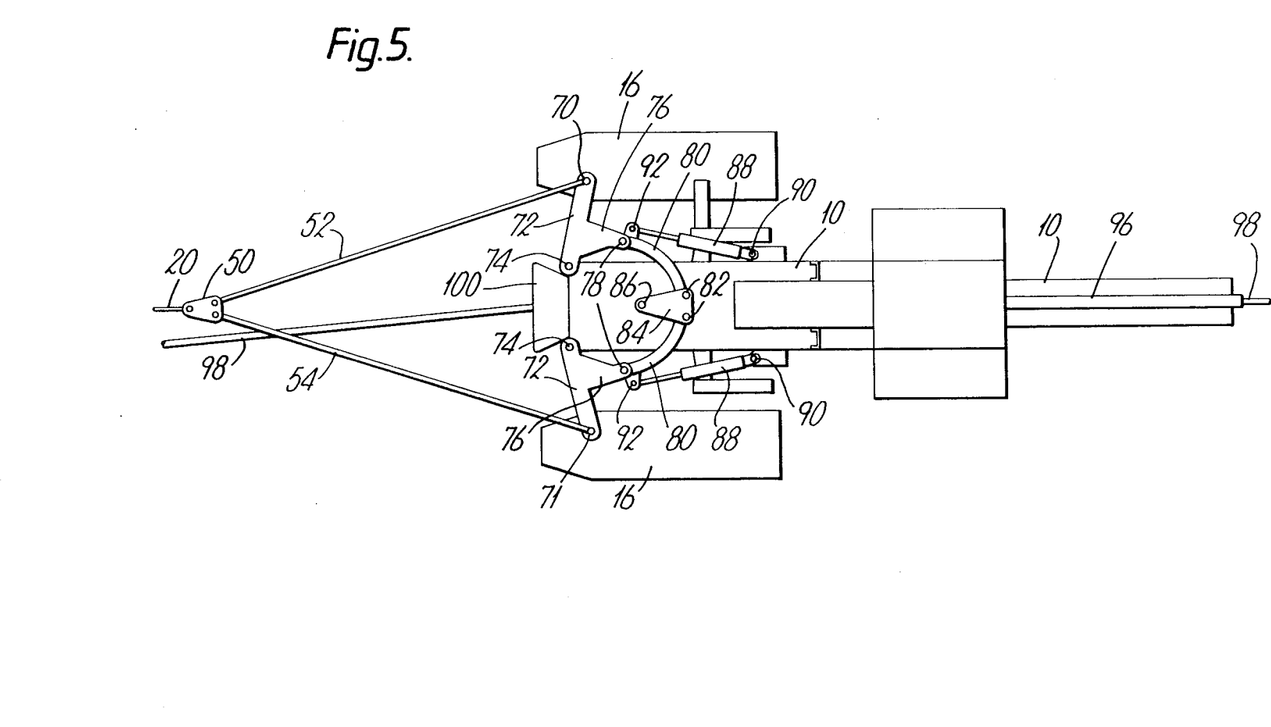
FIGS. 5 and 6 are diagrammatic plans of a third embodiment, showing different conditions of operation.
Figure 6:
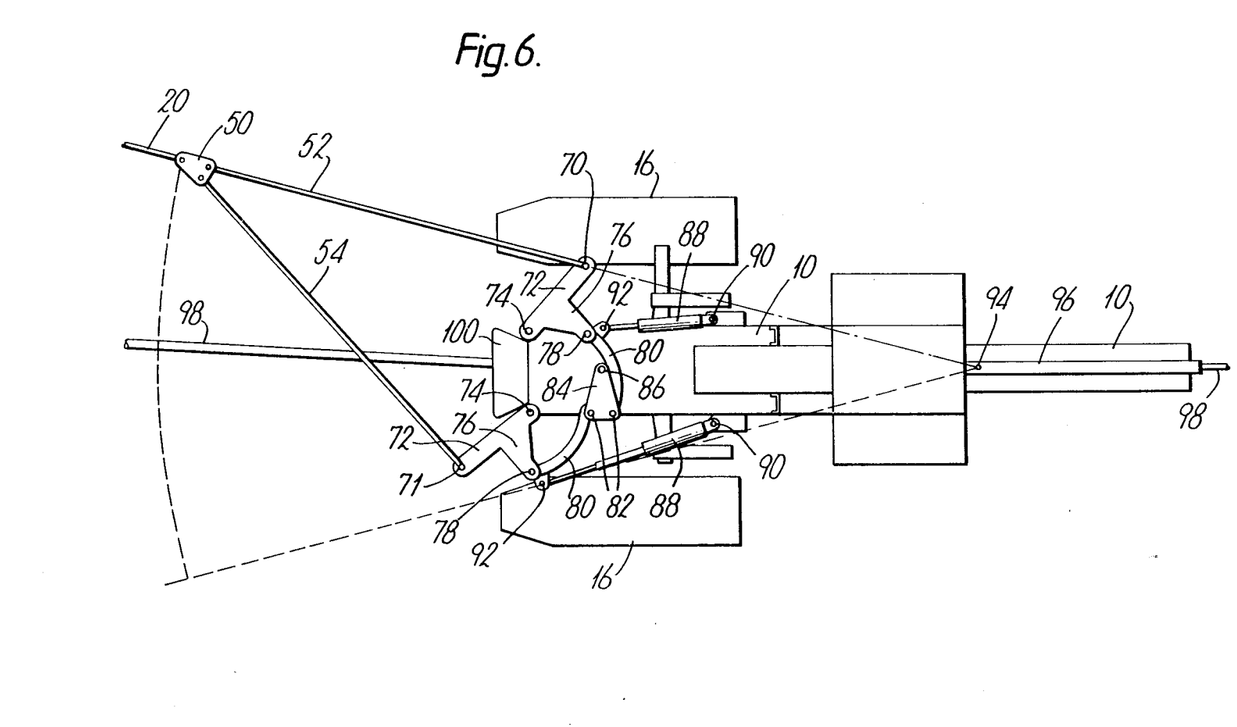
Figure 7:
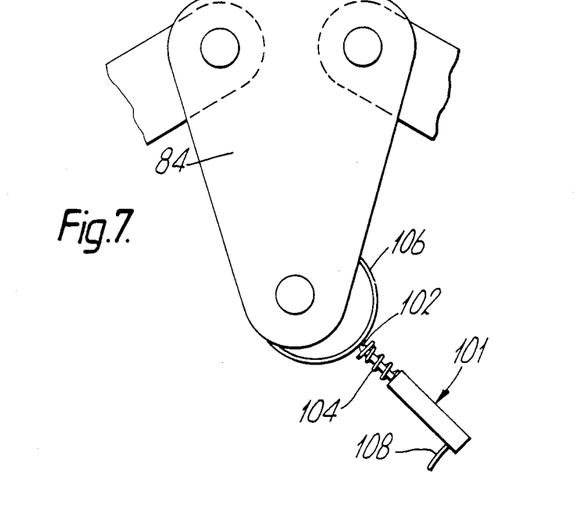
FIG. 7 is a view of part of the third embodiment.

FIGS. 5, 6 and 7 show a cable plough in which the bridle 52, 54 is connected to two hitch device parts 70, 71 respectively, adjacent the ends of like arms 72 of two bell-cranks, each connected about a vertical pivot 74 to the plough body 10. The other arms 76 of the cranks are pivotally connected about vertical pivots 78 to the ends of similar cranked links 80. The other ends of the links 80 are connected about vertical pivots 82 to a crank plate 84. The crank plate 84 is connected about a vertical pivot 86 to the plough body 10.

The mechanism for relatively deflecting the tow wire 20 is two rams 88 each arranged between a pivot element 90 on the plough body 10 and a pivot element 92 on a respective link 80. The rams 88 are operable together, connected hydraulically in parallel, one extending and one retracting to move the bell-cranks and linkage to positions in the range from the mid-position shown in FIG. 5 to either extreme position as indicated in FIG. 6, in which the tow wire 20 is shown at maximum angular offset. In that condition, the tension in the tow wire 20 mainly passes through the bridle wire 52 which is co-linear with the wire 20. In all positions of the bell-cranks and linkage the tension in the tow wire 20 effectively acts through a virtual hitch point fixed at 94 over the centre of resistance, which is coincident with the vertical line through the approximate centre of curvature of the path of the apex of the bridle 50, 52, 54.

That condition holds generally for equilibrium conditions of ploughing. However, during ploughing across a sideslope or under other conditions imposing side-forces or turning moments on the plough, the mechanism is adjusted so that forces are imposed on the plough by the tow wire to counter the external forces. The plough then pursues its required course but the tension in the tow wire may pass outside the vertical line through the centre of resistance. Also, to change the plough's course, the mechanism is adjusted to deflect the line of the tension in the tow wire away from the centre of resistance. This introduces a moment causing the plough to turn. When equilibrium conditions are again established, the tension again passes through the vertical line through the centre of resistance.

The forces required to be exerted by the rams 88 are relatively small. The large forces imposed by the bridle on the bell-cranks are mutually reacted within the bell-cranks and linkage so that only friction is required to be overcome by the rams 88.

Figure 10:
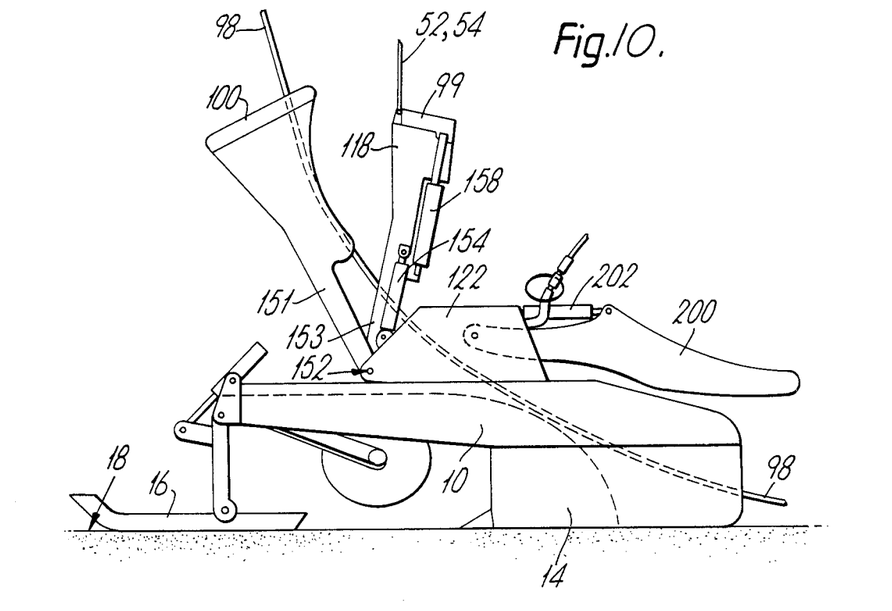

The plough shown in FIGS. 5 to 7 forms a very narrow trench by means of a very narrow share of substantially the same width as a curved, hydraulically operated presser 96 similar to that shown in FIGS. 10 and 11, which extends downwardly above the cable 98 being buried and presses the cable 98 into the trench. The cable 98 extends through a bellmouth 100 and through a longitudinal channel in the top of the plough body 10. The cable 98 downwardly extends into a narrow vertical slot in the body 10 and between the landsides 14. The presser 96 is movable upwardly and downwardly in the slot.

It is necessary in all embodiments of the invention for the setting of the steering mechanism to be known so as to provide information for the control of the position of the towing vessel and hence control of the steering. Accordingly, a monitor transducer is provided on the plough or other implement, for example as shown in FIGS. 2, 4 or 7. The transducer 101 shown in FIG. 7 is a linear displacement transducer such as a potentiometer, for example, which is actuated by a follower 102. The follower 102 is pressed by a compression spring 104 against a cam 106 secured, for example, to the crank plate 84 shown in FIG. 6. The range of angular positions of the crank plate 84 is represented by a range of electric signals transmitted along a conductor 108 connected to the transducer 101. A similar transducer or another type of transducer such as an angular transducer can be used to monitor the setting of the steering mechanism in other embodiments of the invention. As a further alternative, switches or other detectors can be used instead of a transducer to give indications of particular positions of the steering mechanism such as the end positions and, if required, intermediate positions, to monitor the steering mechanism setting. Instead of a transducer, a television camera on the implement can be used to monitor the setting.

Figure 8:
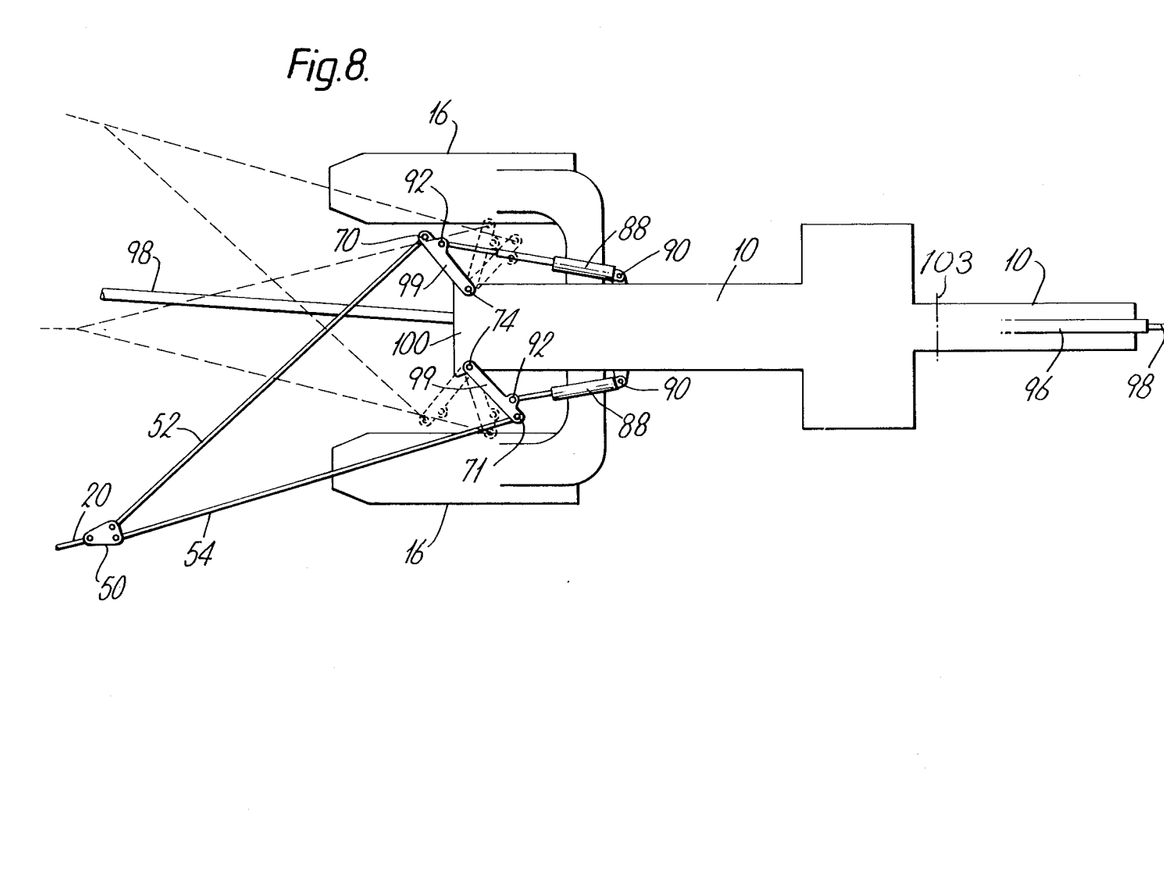
FIG. 8 is a diagrammatic plan of a fourth embodiment.

FIG. 8 shows a plough similar to that shown in FIGS. 5 to 7, but in which instead of two bell-cranks connected by a linkage, the bridle 52, 54 is connected to hitch device parts 70, 71 on arms 99 each pivotally connected about vertical pivots 74 to the plough body 10. The rams 88 are connected between elements 90 on the body 10 and elements 92 on the arms 99. The rams 88 are operated together in series, a volume of pressurised fluid entering one end of one cylinder as an equal volume of pressurized fluid leaves the same end of the other cylinder. The rams 88 in this embodiment are required to exert relatively larger forces than the rams 88 used in the embodiment of FIGS. 5 to 7. Otherwise the construction is the same as that embodiment.

The embodiment shown in FIG. 8 requires relatively small forces to adjust the rams while the tow wire 20 is in the vertical plane through the longitudinal centre line of the plough, or while the tow wire is inclined at relatively small angles to that plane.

In a modification (not shown) of the embodiment shown in FIG. 8 the flow of pressurised fluid to the rams 88 is controlled so that the relationship between the extension of one ram and the retraction of the other for example exactly simulates the relative actions of the rams shown in FIG. 5 or is otherwise controlled so that the path of the apex of the bridle has a definite centre of curvature which is coincident with the vertical line through the centre of resistance of the plough between the landsides.

In FIG. 8 as shown the path of the apex of the bridle is not a true arc but it approximates to an arc having a definite centre of curvature only for the small range of angles of inclination of the tow wire to the line of plough advance. Over wider angles the centre of curvature moves along a line 103 transverse to the length of the plough.

Figure 9:
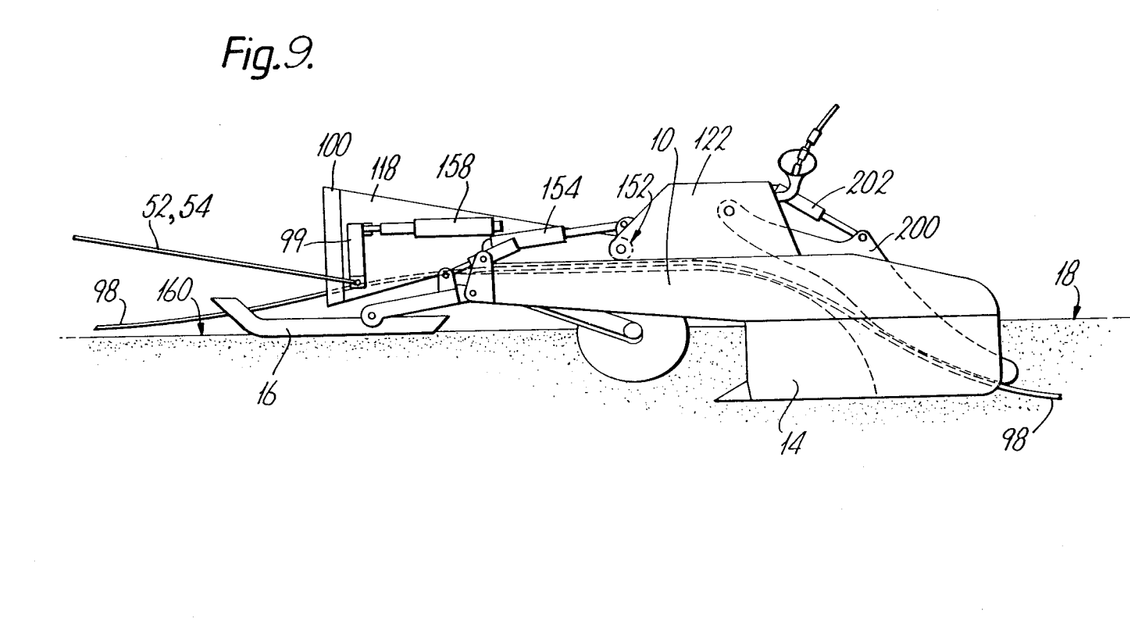
FIGS. 9 and 10 are diagrammatic side elevations of a sixth embodiment, showing different conditions of operation.

FIGS. 9 and 10 show a cable plough similar to those shown in FIGS. 5 to 7 or in FIG. 8. The plough can be lowered to the seabed by means of the tow wire which is connected by a bridle 52, 54 to the ends of arms 99 corresponding to the arms 99 in FIG. 8. The arms 99 are movable by respective rams 158. The arms and rams are part of a drawbar assembly 118 which has rearwardly-extending arms 153. The arms 153 are pivotally connected at respective pivot pins at 152 to the superstructure 122 of the plough.

The bellmouth 100 has a transverse cross-section of inverted U shape so that it does not extend beneath the cable 98 (which is being laid) except at its entrance. At the entrance there is a removable chin-piece (not shown) which completes the encirclement of the cable 98 at the bellmouth entrance. The rear of the bellmouth is formed as two arms 151 with their ends connected at respective horizontal pivot pins at 152 to the superstructure 122.

The plough can be lowered to the seabed surface 18 on the tow wire from the surface tow vessel, the cable 98 to be laid descending in a smooth curve as shown through the bellmouth 100. The plough can be lifted from the seabed by means of the two wire and "flown" over obstacles such as rocks, pipelines or cables. The bellmouth 100 which can be relatively small can swing about its pivots 152 independently of the drawbar 118; or the bellmouth can be larger and fixed to the frame of the plough. This ensures that movements of the plough relative to the cable 98 do not cause excessive bending of the cable over the edge of the bellmouth.

The drawbar 118 is raised and lowered by a pair of rams 154 pivotally connected between the drawbar 118 and the superstructure 122. The elevated drawbar ensures the plough is kept stable on landing on the seabed and during "flying" maneuvers.

FIGS. 9 and 10 also show the presser 200 referred to above adjustable by a ram 202 to position the cable 98 in the slot in the plough.

In a modification (not shown) a transverse formation similar to the formation 38 (FIGS. 3 and 4) has a rectilinear face against which the hitch element acts instead of a curved face. In such a construction the steering ram or other mechanism sustains a component of the towing force in all positions of the tow member other than pulling straight ahead with the hitch element centrally positioned. The component of force sustained by the mechanism varies with the offset angle between the tow member and the direction of advance of the implement and quite a large amount of power is needed to move the hitch element at a significant speed. In another modification applicable to any embodiment the landside surface, or each such surface, is provided by a wheel or wheels engaging the ground or seabed.

In FIGS. 1 and 2 the force in the ram is zero under equilibrium conditions. The force required to steer the implement is relatively low so that relatively little power is needed to change the ram setting at a useful speed. The force needed is independent of the offset angle. In FIGS. 3 to 7 and 9 a virtual hitch point is provided for the tow member instead of the real hitch point used in FIGS. 1 and 2 whilst retaining the benefits of zero force at equilibrium, low power requirement and independence of steering force from offset angle.

In a typical steering maneuver, for example, the effect of imposing a steering moment on the implement which, as described herein, has a landside surface and is towed by a long tow member, is to cause the implement to rotate immediately until the moment is reduced to zero, with the direction of motion of the implement changed so that it is initially different from that of the towing vessel or vehicle. The implement then moves sideways relative to the track of the vessel, the implement and the tow member rotating about the vessel until a new equilibrium is achieved, with the implement running along a path to one side of its original track. Such a maneuver could arise where the required course undergoes a change of direction.

Where the implement is a plough, for example, trenching a pipeline or cable, side-forces on the pipeline or cable are eliminated or are rendered negligible by very minor corrections to the setting of the steering mechanism. The corrections are made in response to indications obtained from the transducers, already mentioned, monitoring the relative position of the plough and the pipeline or the mutual reaction force between them. Thus, control of the implement is also exercised along straight courses.

Where the implement follows a working course along a sideways-sloping seabed, or in the presence of sea cross-current, the steering mechanism at a fixed setting can provide oppositely-acting forces acting on the implement and the tow member. Those forces then counteract the effect of the slope or current, so preventing the implement from sideways deflection away from its course. The oppositely-acting forces may provide, at a fixed setting of the steering mechanism, a moment acting on the implement and countering a moment resulting from external forces. In that way the implement is prevented from changing its angular orientation about a vertical axis as it pursues its working course.

The invention is applicable to various ground engaging implements, including cable ploughs, pipeline ploughs and implements for surveying or testing ground or items such as cables or pipelines, for example, or for other purposes. Among such purposes are included:

1. Following a pipeline or cable, minimising side forces.
2. Coping with side slopes.
3. Moving a pre-laid cable and trenching somewhat to one side of as-laid position.
4. Moving a pipeline and trenching somewhat to one side, perhaps to avoid an obstruction to trenching.
5. Trenching a cable accurately alongside a pipeline or other cable. This goes well with simultaneous lay and trench.
6. Following a previously marked route, e.g. track left by earlier passage of the implement or another device.
7. Following a previously determined course using only a navigation system, e.g. acoustic.
8. Steering a scraper to provide a precise control over soil removal and placement.
9. Steering a soil surveyor through areas of interest.
10. Executing zig-zags with a cable plough to introduce extra cable into a route so that pulling a loop of cable up to the sea surface for repairs is possible.
11. Executing zig-zags to consume any slack generated in front of a plough when trenching a previously laid cable.

The invention is applicable to implements for use under water, whether towed by ship or other vessel or by a tractor or other vehicle. The landside surface of the implement, or each such surface, is either vertical or inclined.

The forces on the pipeline or cable can be zero or negligible because the plough is steered accurately along the pipeline or cable without requiring steering force to be derived from the pipeline or cable.

The invention can be used in ploughs which form trenches for pipelines or cables, which have been previously laid for example, or which are laid as the plough forms the trench. Also, the invention can be used in ploughs which push soil into a previously formed trench to bury a cable or pipeline in the trench.

The invention can be used to enable a plough to follow a path along or close to a pipeline or cable, the steering ram or rams or other mechanism being controlled for example in response to signals derived from a transducer which responds to the position of the pipeline or cable or the force exerted on it by the plough. For example, the transducer may engage the pipeline or cable and produce a signal derived from changes in the force of engagement; the transducer may derive a signal by electric, electromagnetic, electro-capacitive, sonic, optical coupling, or other means, either by making contact with the pipeline or without contact. Alternatively, the pipeline or cable may be observed by way of remote television camera to enable an operator to adjust the rams remotely, for example.

The plough or other implement is capable of being steered positively under varying seabed conditions. The steering moment is derived from the tension in the two wire and is not dependent on limited reactions available from a pipeline or cable or from the seabed via the skids. The towing force is not required to overcome the frictional resistance caused by the sliding engagement between the plough or other implement surfaces used to provide such reactions.

With the exception of the embodiment shown in FIG. 8, extremely low forces are required to be overcome by the ram or rams when they adjust in length from any setting to effect steering, and the rams are required to sustain only equally small loads between adjustments.

I claim:

1. A method of operating a ground engaging implement beneath water so that it travels on the bed of the water along a working course comprising towing the implement by means of an elongate, flexible tow-member which is connected to said implement and which extends lengthwise ahead thereof to a remote loading end of said tow-member, effecting movement of said tow-member sideways as seen in plan relatively to said implement by operation of powered means forming part of said implement, said movement requiring no change in the position or direction of movement of said leading end, the change in the line of action of the tension in said tow-member resulting from said movement imposing a couple upon said implement which couple changes the direction of said working course or counteracts deviation of said implement from a desired direction thereof, and monitoring the relative position of said tow-member and said implement.

2. A ground engaging implement operable beneath water to travel on the bed of the water along a working course when towed by an elongate flexible tow-member which is connected to said implement and which extends ahead thereof to a remote leading end of said tow-member, said implement comprising a body, means defining a hitch-point through which tension in said tow-member is effectively applied to said body under equilibrium conditions, powered means operable to effect movement of said tow-member sideways as seen in plan relatively to said body, said movement requiring no change in the position or direction of movement of said remote leading end of said tow-member, the effective direction of tension in said tow-member after said movement no longer passing through said hitch-point so that said tension imposes a couple on said implement which couple changes the direction of said working course or counteracts deviation of said implement from a desired direction thereof, and monitor means by which the relative position of said tow-member and said implement can be monitored.

3. A ground-engaging implement operable beneath water to travel on the bed of the water along a working course when towed by a tow member connected to the implement, said implement comprising a body and first and second pivot means on said body and further comprising monitor means by which the relative position of the tow member and the implement can be monitored, first means to which said tow member is connected, said first means including first and second arms connected to said first and second pivot means, respectively, and extending sideways from said body, a bridle connecting said tow member to said arms, third and fourth pivot means on said first and second arms, respectively, second means connected to said implement and including fifth and sixth pivot means on said body; and hydraulic ram means interconnecting said first and said second means, said ram means comprising a first ram interconnecting said third and said fifth pivot means and further comprising a second ram interconnecting said fourth and said sixth pivot means, and said ram means being effective to cause oppositely-acting forces to be imposed on the implement and on the tow member, respectively, said force imposd on said tow member having a direction crossing said tow member viewed in plan.

4. An implement according to claim 3 comprising crank means pivotally connected to said body, surfaces on said body on which soil forces act and defining a center of resistance through which passes the resultant of said forces created by advance of the implement, two links each connecting a respective one of said first and second arms to said crank means, said bridle having an apex connected to said tow member, said apex describing a locus when said rams are adjusted in length and said locus being an arc centered at a virtual hitch point coincident with a vertical line through said center of resistance.

5. An implement according to claim 4 which comprises a drawbar assembly which includes said arms and said rams and which is pivotally connected about a horizontal axis to said body and which also comprises further hydraulic ram means operable to raise and lower said drawbar assembly between a lowered position in which said tow member can tow the implement along said course and a raised position allowing the implement to be lowered to or raised from said bed while suspended by the tow member.

6. An implement according to claim 5 for burying a submarine cable in said bed comprising a bellmouth, through which said cable passes and which is pivotally connected about a horizontal axes to said body for angular up and down movement independently of said drawbar assembly.

7. A ground-engaging implement operable beneath water to travel on the bed of the water along a working course when towed by a tow member connected to the implement, said implement comprising a body and an anchorage on said body, the tow member being connected to said anchorage, said implement further including monitor means by which the relative position of the tow member and the implement can be monitored, first means to which said tow member is connected, said first means being positioned on said tow member ahead of said anchorage, second means connected to said implement, said second means being positioned on said body at a location spaced away from one side of said tow member; and hydraulic ram means interconnecting said first and said second means, said ram means being directly effective to cause oppositely-acting forces to be imposed on the implement and on the tow member, respectively, said force imposed on said tow member having a direction crossing said tow member viewed in plan, and said direction being aligned with the lengthwise direction of said means.

8. A ground-engaging implement operable beneath water to travel on the bed of the water along a working course when towed by a tow member connected to the implement, said implement comprising monitor means by which the relative position of the tow member and the implement can be monitored, said implement further comprising a body, surfaces on said body on which soil forces act and defining a center of resistance through which passes the resultant of said forces created by advance of the implement, a transverse formation provided by said body, a curved face on said formation having a center of curvature coincident with or adjacent a vertical line through said center of resistance, first means to which said tow member is connected, said first means comprising a carriage movable along said formation and acting against said curved face, first and second pivot means on said carriage, second means connected to said implement, said second means comprising third and fourth pivot means on said body, and hydraulic ram means interconnecting said first and said second means, said ram means comprising a first ram interconnecting said first and third pivot means and a second ram interconnecting said second and fourth pivot means, and said ram means being effective to cause oppositely-acting forces to be imposed on the implement and on the tow member, respectively, said force imposed on said tow member having a direction crossing said tow member viewed in plan.

* * * * *